(12) United States Patent
Becker

(10) Patent No.: US 7,477,234 B2
(45) Date of Patent: Jan. 13, 2009

(54) INTERFACE-CONTROLLED DISPLAY OF A MATRIX DOCUMENT IN REGIONS

(75) Inventor: Wolfgang Becker, Ludwigshafen (DE)

(73) Assignee: SAP AG, Walldorf (DE)

( * ) Notice: Subject to any disclaimer, the term of this patent is extended or adjusted under 35 U.S.C. 154(b) by 568 days.

(21) Appl. No.: 11/135,320

(22) Filed: May 24, 2005

(65) Prior Publication Data

US 2006/0090125 A1 Apr. 27, 2006

(30) Foreign Application Priority Data

May 24, 2004 (DE) .................... 10 2004 025 440

(51) Int. Cl.
*G09G 5/00* (2006.01)
(52) U.S. Cl. ...................... 345/156; 345/100
(58) Field of Classification Search ............... 345/156, 345/157, 159, 168–170, 179, 571, 572; 715/503, 715/510, 764, 514

See application file for complete search history.

(56) References Cited

U.S. PATENT DOCUMENTS

| | | | | |
|---|---|---|---|---|
| 4,920,504 | A | * | 4/1990 | Sawada et al. .............. 345/573 |
| 5,787,411 | A | | 7/1998 | Groff et al. |
| 5,926,806 | A | | 7/1999 | Marshall et al. |
| 6,000,621 | A | * | 12/1999 | Hecht et al. ................. 235/494 |
| 6,115,704 | A | | 9/2000 | Olson et al. |
| 6,141,699 | A | | 10/2000 | Luzzi et al. |
| 6,564,212 | B2 | | 5/2003 | Koskas |
| 6,967,661 | B2 | * | 11/2005 | Lin ............................ 345/531 |
| 6,983,276 | B2 | | 1/2006 | Tenorio |
| 2002/0180796 | A1 | | 12/2002 | Millmore et al. |
| 2003/0033277 | A1 | | 2/2003 | Bahulkar et al. |
| 2003/0095145 | A1 | | 5/2003 | Patrizio et al. |
| 2003/0128212 | A1 | | 7/2003 | Pitkow |
| 2004/0032432 | A1 | | 2/2004 | Baynger |

(Continued)

FOREIGN PATENT DOCUMENTS

WO    WO 03/104978 A2    12/2003

OTHER PUBLICATIONS

Spenke, Michael et al., "Focus: The Interactive Table For Product Comparison and Selection," Proceedings of the ACM Symposium on User Interface Software and Technology, Seattle, Nov. 6-8, 1996, pp. 1-10.

(Continued)

*Primary Examiner*—Nitin Patel
(74) *Attorney, Agent, or Firm*—Finnegan, Henderson, Farabow, Garrett & Dunner

(57) ABSTRACT

A method for displaying regions of a matrix. The matrix has at least one column and one or more rows having one or more fields related to individual data records. The method comprises: displaying a starting region of the matrix, the starting region having one or more rows with each row having a field corresponding a data record; determining a field corresponding to the matrix position which the computer user indicates via a first user interface; obtaining a data record to which the determined field is related; identifying the rows of the matrix relating to the obtained data record; displaying, on detection of a user request via a second user interface to continue to display, a second region of the matrix which contains at least one identified row.

19 Claims, 5 Drawing Sheets

U.S. PATENT DOCUMENTS

| | | | |
|---|---|---|---|
| 2004/0073546 A1 | 4/2004 | Forster et al. | |
| 2004/0095309 A1* | 5/2004 | Vincent et al. | 345/107 |
| 2004/0220908 A1 | 11/2004 | Finlay et al. | |
| 2005/0060300 A1 | 3/2005 | Stotle et al. | |
| 2005/0066291 A1* | 3/2005 | Lewak | 715/810 |
| 2006/0101394 A1 | 5/2006 | Becker | |

OTHER PUBLICATIONS

"Browsing: A Novel Facility For Exploring the Contents of a Datastore," IBM Technical Bulletin, IBM Corp., New York, US, vol. 33, No. 7, Dec. 1, 1990, pp. 177-180, XP000108424.

European Search Report dated Jul. 17, 2007, for the counterpart European Patent Application No. 05011096.4.

* cited by examiner

INTERFACE-CONTROLLED DISPLAY OF A MATRIX DOCUMENT IN REGIONS

RELATED APPLICATIONS

This application claims priority to German Patent Application No. 10 2004 025 440.0, titled "Interface-Controlled Display of a Matrix Document in Regions," filed May 24, 2004.

TECHNICAL FIELD

The invention relates to user interfaces for displaying data in general, and, more specifically systems and methods for displaying regions of a matrix.

BACKGROUND

Computer users communicate with their computers via interfaces of all types. To cite just a few examples: the users operate keyboards and mice, guide pens or fingers over touch-sensitive surfaces, or speak into microphones. The computer interprets these actions as instructions and displays documents on screens or printers accordingly.

The interfaces conventionally comprise hardware and software components. Graphical user interfaces (GUI) interaction takes place using mouse pointers, scroll bars and buttons on the screen, guided by keyboards and pointing equipment (for example mouse, tracker ball) in the user's hand.

As with any user-computer communication, there are limitations. For example, the area of the screen and the size of the letters determines whether documents can be displayed in their entirety or whether documents have to be displayed broken down into regions.

Horizontal or vertical scroll bars are suitable, for example, for displaying large documents. Techniques such as scrolling or paging are used in this connection.

Improvements are desirable, for example, to avoid undesirable delays during viewing that occurs when the user alternately changes between mouse and keyboard.

SUMMARY

A method for displaying regions of a matrix is provided. The matrix has at least one column and one or more rows having one or more fields related to individual data records. The method comprises: displaying a starting region of the matrix, the starting region having one or more rows with each row having a field corresponding a data record; determining a field corresponding to the matrix position which the computer user indicates via a first user interface; obtaining a data record to which the determined field is related; identifying the rows of the matrix relating to the obtained data record; displaying, on detection of a user request via a second user interface to continue to display, a second region of the matrix which contains at least one identified row.

A machine-readable storage medium having stored thereon machine executable instructions is provided. The execution of the instructions is adapted to implement a method for displaying regions of a matrix. The matrix has at least one column and one or more rows having one or more fields related to individual data records. The method includes: displaying a starting region of the matrix, the starting region having one or more rows with each row having a field corresponding a data record; determining a field corresponding to the matrix position which the computer user indicates via a first user interface; obtaining a data record to which the determined field is related; identifying the rows of the matrix relating to the obtained data record; displaying, on detection of a user request via a second user interface to continue to display, a second region of the matrix which contains at least one identified row.

A system is provided. The system includes memory in communication with a processor. The memory stores instructions and the processor executes the instructions. The instructions are for: displaying a starting region of the matrix, the starting region having one or more rows with each row having a field corresponding a data record; determining a field corresponding to the matrix position which the computer user indicates via a first user interface; obtaining a data record to which the determined field is related; identifying the rows of the matrix relating to the obtained data record; displaying, on detection of a user request via a second user interface to continue to display, a second region of the matrix which contains at least one identified row.

The foregoing summarizes only a few aspects of the disclosed embodiment and is not intended to be reflective of the full scope of the embodiments claimed. Additional features and advantages are set forth in the following description, may be apparent from the description, or may be learned by practicing the teachings of the disclosure. Moreover, both the foregoing summary and the following detailed description are exemplary and explanatory and are intended to provide further explanation of what is claimed.

BRIEF DESCRIPTION OF THE DRAWINGS

The accompanying drawings, which are incorporated in and constitute a part of this specification, illustrate one embodiment and together with the description, serve to explain the principles of the operation of the embodiment.

DESCRIPTION OF THE EMBODIMENT

Reference will now be made in detail to the present exemplary embodiments, examples of which are illustrated in the accompanying drawings. Wherever possible, the same reference numbers will be used throughout the drawings to refer to the same or like parts.

Figure 1:
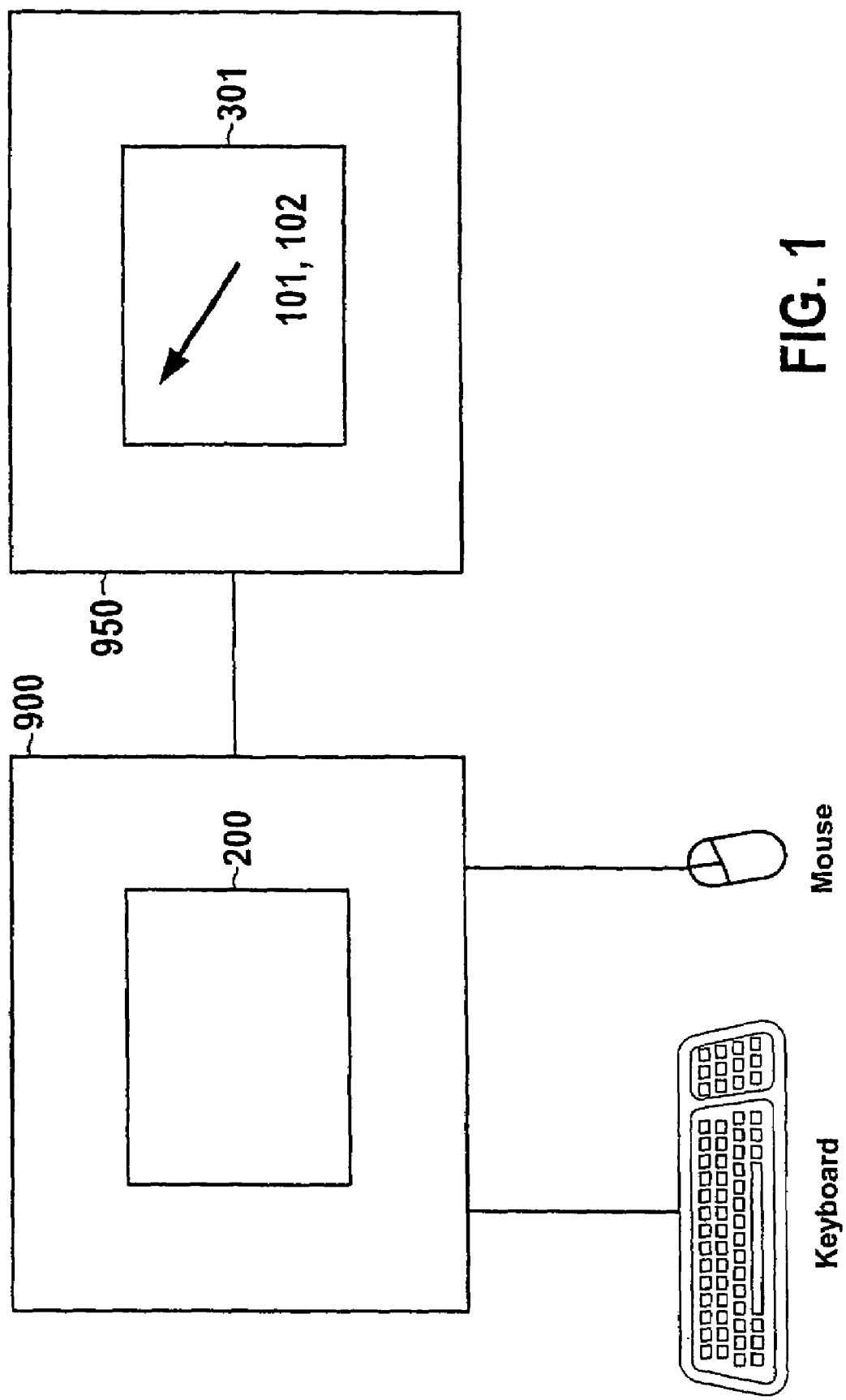
FIG. 1 shows a computer with a display device within which a region of a matrix is displayed.
Figure 2:
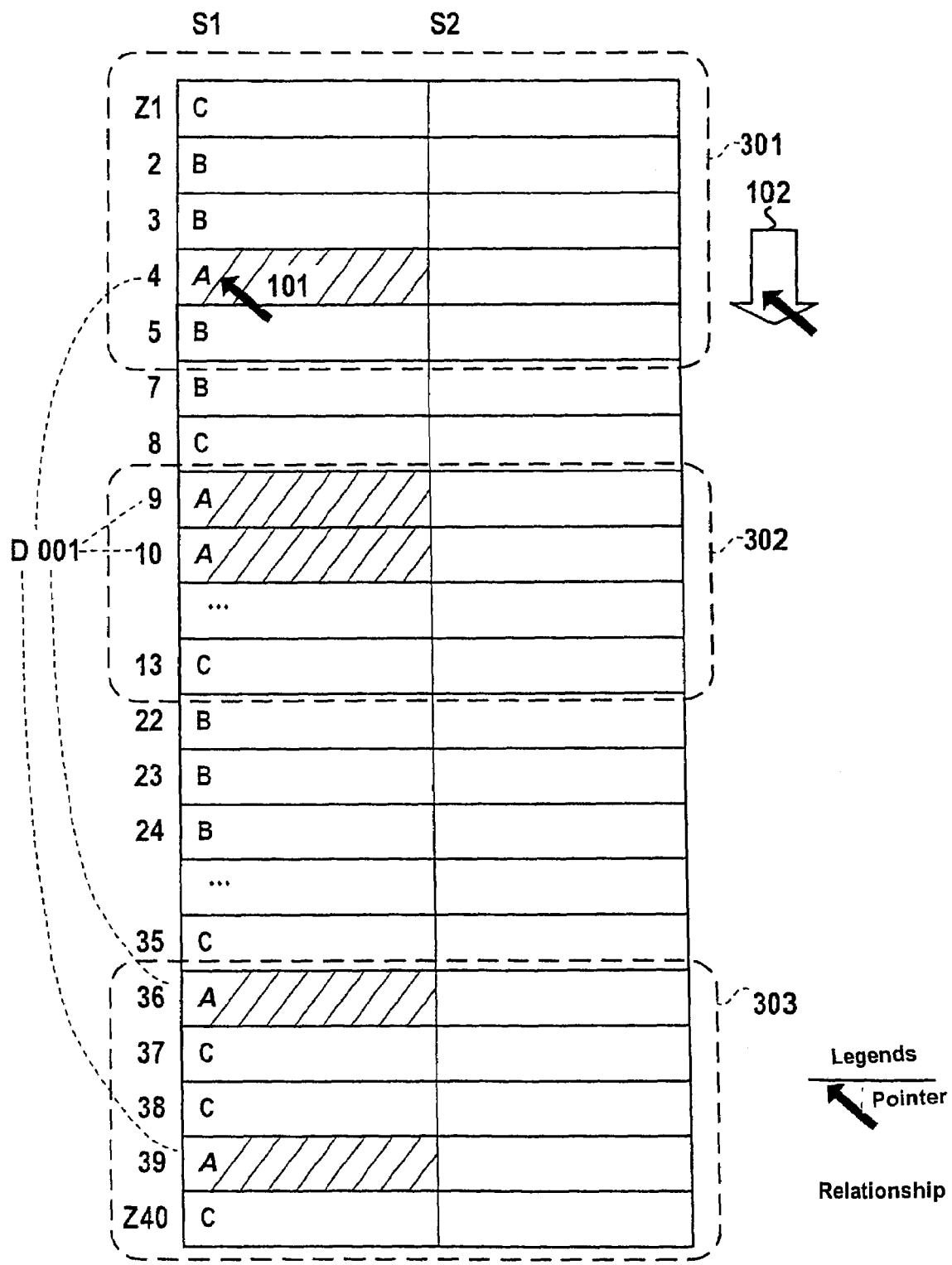
FIG. 2 shows an exemplary matrix which, in accordance with the principles of the present invention, is displayed in regions on a screen.
Figure 3:
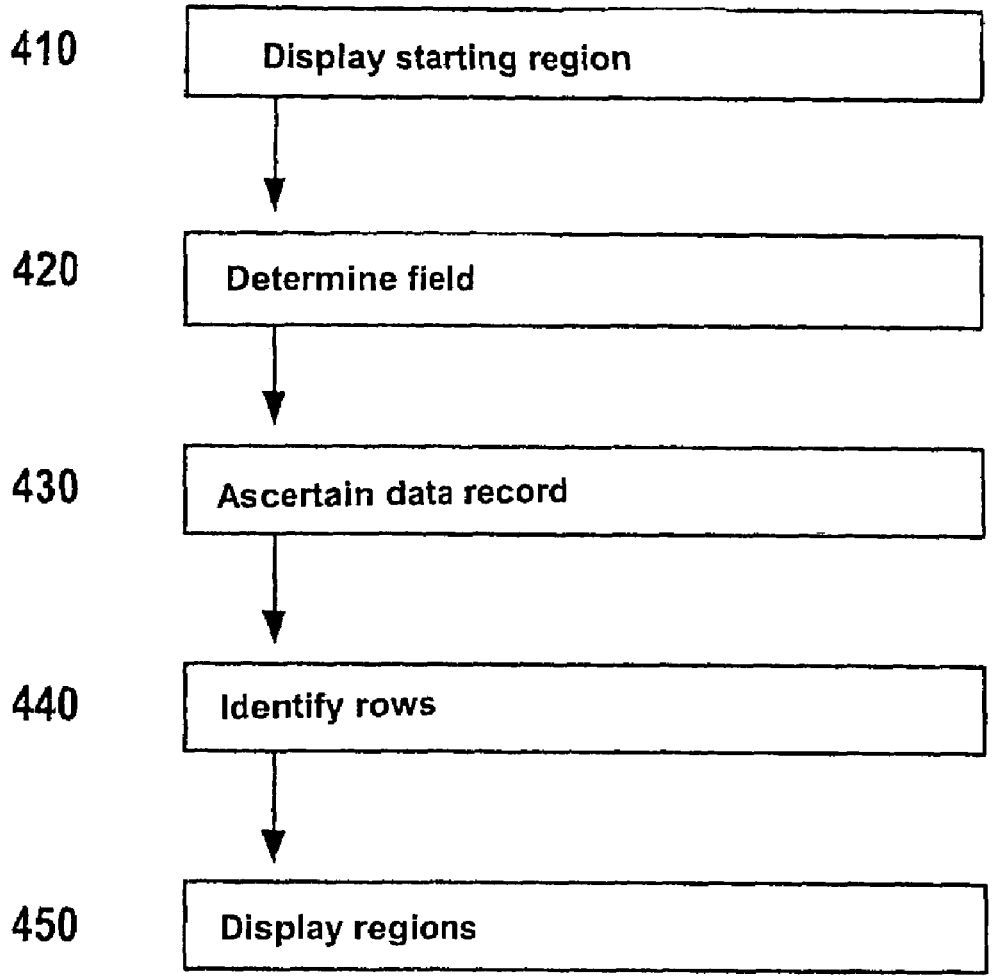
FIG. 3 shows a flow chart of a process in accordance with the principles of the present invention.

The description introduces the principles of the invention with a computer and a display device in FIG. 1, a simplified matrix in FIG. 2, and a flow chart in FIG. 3. Statements regarding configurations follow. The description begins with the explanation of hierarchical relationships of data records to each other in conjunction with FIGS. 4 to 5 and concludes with hints for optimization.

Sample data in a matrix form the operating protocol of various computer systems (systems A to C), which are observed, for example, over days, weeks, or even months. Such data relates, for example, to events such as start and stop or details about programs and services that are executed on the computer systems. The computer systems can contain modules, which may be designated A-01, A-02, A-03, B-01, etc. In practical embodiments matrices with hundreds or thousands of entries can be used.

Terms such as matrix, column (S), row (Z), and field are used here as is conventional in mathematics, with columns being arranged in the vertical direction and rows in the horizontal direction. Without deviating from the claimed principle, the system can alternatively be implemented using horizontal columns and vertical rows.

FIG. 1 shows a computer with a display device within which a region of a matrix is displayed. The computer 900 has user interfaces that may be implemented with conventional input and output devices such as a keyboard, a mouse, and a screen.

The screen represents an output device 950 and displays, for example the region 301 of an exemplary matrix document.

The user may interface with the computer 900 via a first interface 101 and a second interface 102, which in this case are symbolized on the output device 950 as mouse pointers. A table 200 may be used in the computer 900 for storing relationships of matrix fields to data records. Table 200 may also be a databases, for example.

Table 200 may also represent computer programs which are used for implementing the process in accordance with the principles of the invention. One skilled in the art is capable of implementing such programs using the present description without further statements being required at this point.

FIG. 2 shows an exemplary matrix which, in accordance with the principles of the present invention, is displayed in regions on a screen. FIG. 2 shows a matrix 300 which may be displayed on a screen in regions. Column S1 shows the computer systems, for example, A, B and C. Column S2 can display sample events, such as start, stop in the systems. To keep the description of the invention simple the contents of column S2 is blank in FIG. 2.

In the example, matrix 300 has 40 rows Z1 to Z40. The matrix therefore has too many rows for them all to be displayed at once on a typical display. Therefore regions may be displayed. In the example, each region has five rows: region 301 with rows Z1 to Z5, region 302 with rows Z9 to Z13 and region 303 with Z36 to Z40.

The hatched shaded fields with content A in column S1 are related (dotted lines) to data record D001, stored, for example, in table 200. The displayed contents of field and data records may differ from one another: the letter A is in the field, outside of the displayed matrix the data record may be identified in the computer as D001.

Pointer 101 symbolizes a mouse pointer which may be located over the field Z4/S1. In general, the reference numeral 101 represents a first user interface. Button 102, in conjunction with a mouse pointer, represents a second user interface.

FIG. 3 shows a flow chart of a process in accordance with the principles of the present invention. Reference will be made to FIGS. 1 to 2 in describing the details.

The process 400 is a computer-implemented process for displaying regions of a matrix that has at least one column in which a plurality of fields are in each case related to individual data records.

Process 400 may have one or more of the following steps: displaying a starting region (stage 410); determining a field (stage 420); obtaining the data record related to the field (stage 430); identifying the rows related to the data records (stage 440); and displaying these identified regions (stage 450).

Returning to FIG. 2, there are the regions 301 to 303 of the matrix 300. In column S1 there are the fields Z1/S1 to Z40/S1 that may be related to individual data records such as D001 (FIG. 2 dotted lines), D002, D003, etc. These relationships can be stored outside of the matrix, for example in table 200, with the following contents, for example: fields related to D001 are Z4/S1, Z9/S1, Z10/S1, Z36/S1 and Z39/S1; fields related to D002 may be Z2/S1, Z3/S1, etc. Table 200 may also store other details, such as the indication of the matrix content "A" for the D001 data records, "B" for D002, "C" for D003, etc.

The details of the stages of method 400 may be described using the same example.

In the displaying stage (410), a first region of the matrix 300—here called the starting region 301—is displayed. In the example, the region has the rows Z1 to Z5. Five rows may comprise a region if five rows, for example, is the most rows that may fit on the screen. Lesser than the most rows displayed on a screen may also be used.

In the determining stage (420), a field is determined which corresponds to the matrix position, where the field is determined based on the position the computer user indicates via the user interface 101.

In the example it is field Z4/S1 with the displayed content "A". The user interface 101 is symbolized in FIG. 2 by a mouse pointer, the interface itself implemented with mouse and mouse pointer. The user views the region, decides to request more information on content A, and therefore goes over this field with the mouse and activates the field, for example with a double click. Interface 101 is implemented such that the user identifies the field merely by moving the mouse pointer without having to type in the content of the field (in this case "A") into an input element (for example window, pop-up menu) or the like.

In the obtaining stage (430), the data record to which the determined field (in this case Z4/S1) is related is ascertained by the computer. Table 200 may be queried, for example. The field content "A" itself may play only a subordinate role.

In the identifying stage (440), the rows are identified of which the fields in the column (in this case S1) are related to the identified data record D001. In the example these are the rows Z4, Z9, Z10, Z36 and Z39. Identifying again may take place using table 200. With this stage, the selection is made of which rows are requested to be shown.

In the displaying stage (450) the regions of the matrix which contain at least the identified rows are displayed, and, more precisely, each time a user request for continued display is detected via a second interface 102. In the example the five rows from Z9 are displayed as region 302 and the five rows from Z36 are displayed as region 303. The second interface 102 is symbolized as a button which the user clicks on using the mouse pointer. In other words, as in conventional scrolling, when a special button (here 102) is actuated in this step, the display on the screen is changed such that the relevant data content is moved into the user's center of attention (in this case into the first row of the screen). In accordance with the invention, the display may be limited to a few rows, the rows related to the data record.

Statements on further embodiments follow. In the determining stage (420), row contents can be visually highlighted as soon as the rows are determined. In the example the contents "A" of the fields Z4/S1, Z9/S1, Z10/S1, Z36/S1 and Z39/S1 would be highlighted (hatched in FIG. 2). Alternatively, additional fields in the rows can be highlighted, such as the start/stop details in column 2.

Users sometimes wish to alternate between the displays of the regions. The displaying stage (450) of the other regions can be implemented via a second interface 102 which detects the directed request for continued display. For example, the interface 102 may be a button for the forwards direction and for the backwards direction. In the example of FIG. 2, this button could be used as follows: a forward arrow, which leads to region 302, appears next to region 301 (cf. FIG. 2). A backwards arrow (at 301) and a forwards arrow (at 303) appear next to the region 302 (cf. FIG. 2). Only a backwards arrow appears next to the region 303 as the matrix 300 has reached the end.

The use of first and second user interfaces with identical hardware configuration is useful in the determining (420) and displaying (450) stages. In the example of FIG. 2, screen buttons and mouse pointers may be used for both interfaces 101 and 102 (cf. FIG. 2). An alternative variant manages without a mouse and uses special buttons of a conventional QWERTY keyboard. For example, cursor control keys (up, down, left, right) and a function key (F key) may be used for determining (420) the field (interface 101) and the page control keys (page up, page down) for detecting the request for continued display (interface 102). It is may prove useful that the user does not have to alternate between keyboard and mouse.

The displaying stage (450) takes place in the example of FIG. 2 with displaying of regions that contain non-determined rows. For example, in rows 11 to 13 the region 302 contains details which are not related to the data record D001. Displaying of irrelevant rows of this type can optionally be dispensed with.

As shown in FIG. 2 regions in which no determined rows occur (for example Z22 to Z35) may not be displayed at all.

The description comes to the explanation of hierarchical relationships of the data records to each other.

Figure 4:
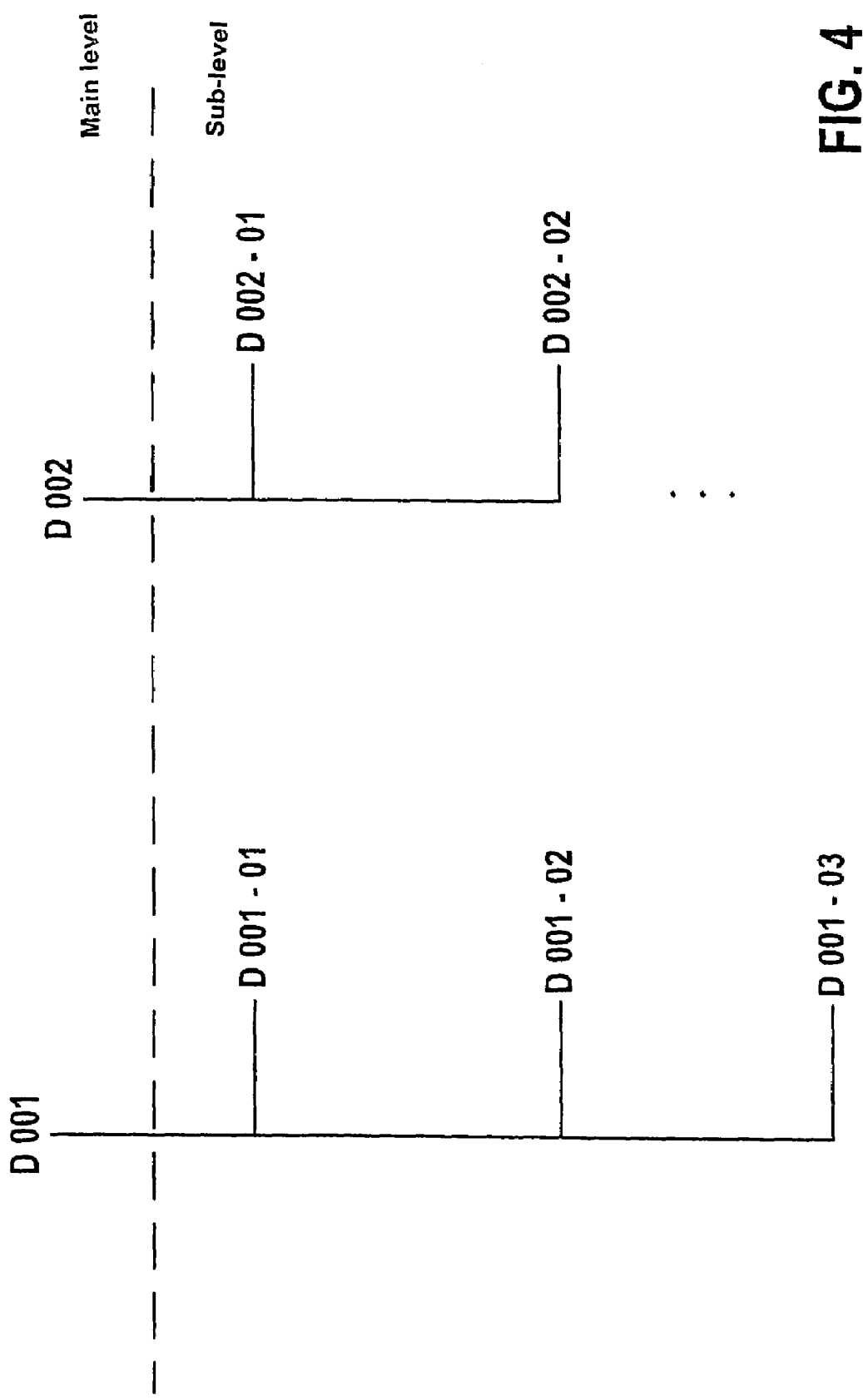
FIG. 4 shows hierarchical relationships in data records.

FIG. 4 shows hierarchical relationships in data records. To remain with the data sample: the computer systems may be hierarchically structured and contain modules which can be designated A-01, A-02, A-03, B-01, etc. Based on the data records, the following structure, for example, may exist: main data record D001 with sub-data records D001-01, D001-02 and D001-03; main data record D002 with sub-data records D002-01 and D002-02, etc. The relationships of the data records within the two hierarchical levels are depicted, again via table 200, for example, and may thus by located outside of the displayed matrix. In the example D001 and D002 belong to the main level and D001-01/02/03 to D002-01/02 to the sub-level.

Figure 5:
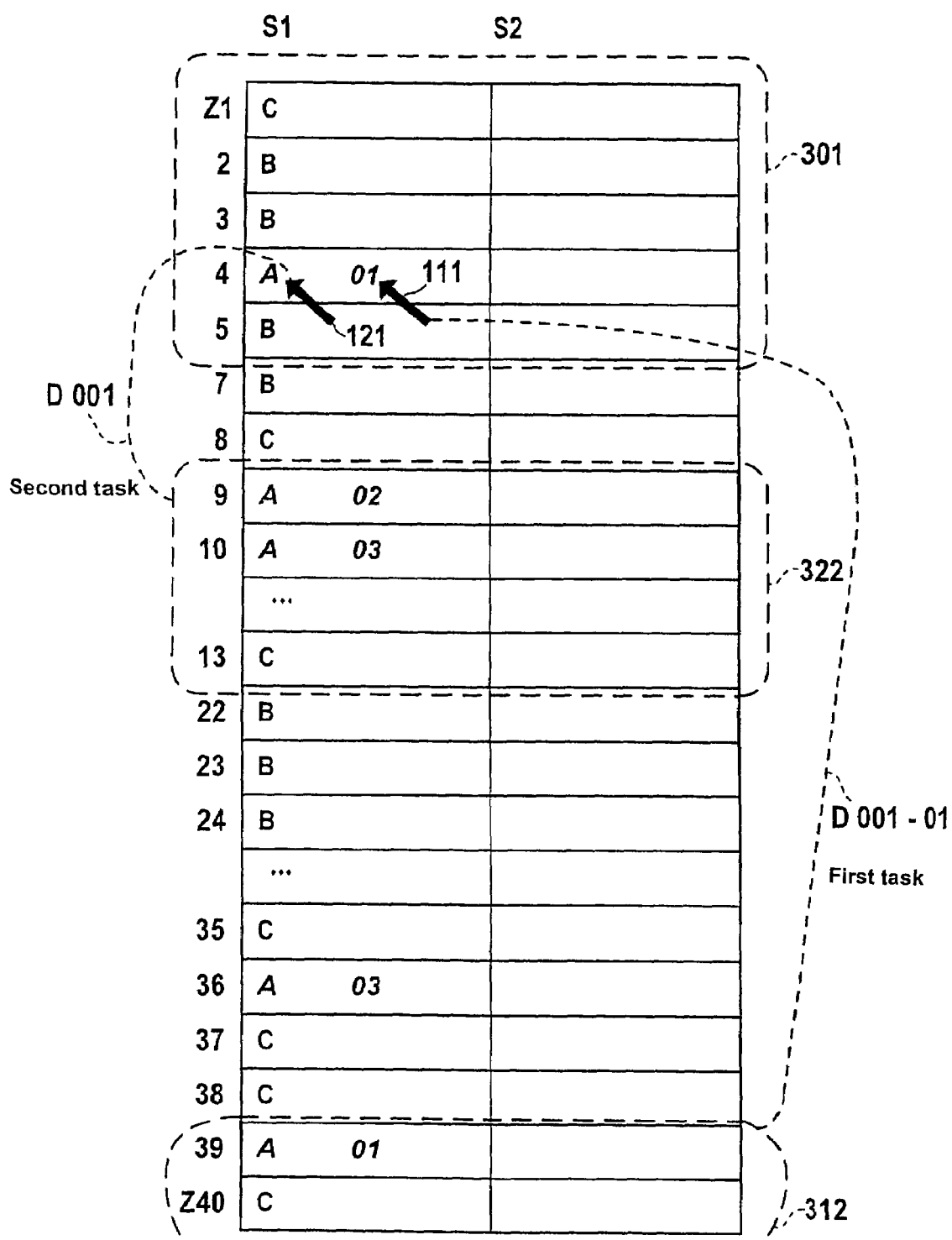
FIG. 5 shows the matrix of FIG. 2 in a further example, with hierarchical relationships of data records being taken into account.

FIG. 5 shows the matrix of FIG. 2 in a further example, with hierarchical relationships of data records being taken into account. From the perspective of the user, who initially only sees the display in the starting region 301, in other words only the identifiers such as A-01, two different display scenarios can be meaningful:

First task: the user desires information about rows containing A-01.

Second task: the user desires information about rows containing A, irrespective of whether this is A-01, A-02 or A-03.

At the starting time (display of the starting region 301), it may not be known whether and how many rows with the desired entries occur. Details on the data records, whether D001 with or without suffix (sub-level, main level) initially may not interest the user.

In other words, the process 400 is extended to applications in which the fields are related to data records (for example D001-01) that are organized in at least one first hierarchical level and one second hierarchical level. In the determining stage (420), an indication of the level 111, 121 may be queried so the identifying stage (440) of the rows takes place while taking account of these relationships to the first level and to the second level. The indications 111, 112 of the levels contain items of information that may be determined via the interface 101.

In the example of FIG. 5, indication 111, 121 takes place via a pointer position within the identified field Z4/S1. If the user is concerned with the first task, he moves the mouse pointer into the right-hand half of this field and activates the pointer (double click for example). This corresponds to indication 111 and the lower level is taken into consideration. Displaying (450) stage would then display region 312. This means the rows from Z39 with entry "A-01" related to D001-01.

If the user is concerned with the second task, he moves the mouse pointer into the left-hand half of this field and activates the pointer. This corresponds to indication 121 and the upper level (D001) is taken into account. Displaying stage (450) would then display region 322. This means the rows from Z9 with the entry "A" related to D001.

A person skilled in the art is capable of supplementing the process of the present invention in order to optimize user interaction.

Thus, buttons can be provided which bring about a preselection within the table. For example, the time reference can be taken into account in the operating protocol (table 200) so only events of a predetermined period (for example the last month) are taken into account and events outside of this period are excluded from display from the outset.

For example, a person skilled in the art can implement the user interfaces in a different manner, for example via context menus that are called up using the right-hand mouse button.

The user may have indications about the absolute or relative frequency of rows or regions which are identified or displayed. For example, the user interfaces (in particular interface 102) can indicate the number of identified rows. For example, the indication "5 hits" can take place in FIG. 5 as five rows are identified in which "A" is in column S1. Alternatively, it can be indicated that, for example, a total of three regions are displayed (i.e. 301 to 303). A relative indication such as "2 further regions" is helpful to the user who is currently looking at region 301. This number "2" can be counted down, so the observer of region 303 is informed that no further regions will be displayed as all rows have been displayed.

It will be readily apparent to those skilled in this art that various changes and modifications of an obvious nature may be made, and all such changes and modifications are considered to fall within the scope of the appended claims. Other embodiments will be apparent to those skilled in the art from consideration of the specification and practice of the disclosure. It is intended that the specification and examples be considered as exemplary only, with a true scope and spirit of the disclosure being indicated by the following claims and their equivalents.

What is claimed is:

1. A method for displaying regions of a matrix, the matrix having at least one column and one or more rows having one or more fields related to individual data records, the method comprising:

displaying a starting region of the matrix, the starting region having one or more rows with each row having a field corresponding a data record;

determining a field corresponding to the matrix position which the computer user indicates via a first user interface;

obtaining a data record to which the determined field is related;

identifying the rows of the matrix relating to the obtained data record;

displaying, on detection of a user request via a second user interface to continue to display, a second region of the matrix which contains at least one identified row.

2. The method of claim 1, where identifying further comprises visual highlighting of content of the rows which are identified.

3. The method of claim 1, wherein displaying further comprises detecting a request for displaying a third region of the matrix which contains at least one identified row.

4. The method of claim 1, wherein determining a field and displaying a second region further comprises using a first user interface and a second user interface with identical hardware configuration.

5. The method of claim 1, wherein displaying further comprises fading out rows that are not identified.

6. The method of claim 1, wherein data records are organized in at least one first hierarchical level and one second hierarchical level, and further comprising:
receiving an indication of the hierarchical level queried; and
identifying further comprises identifying the rows based on the hierarchical level queried.

7. The method of claim 6, wherein the indication takes place by way of a pointer position within the identified field.

8. The method of claim 1, wherein identifying further comprises displaying the frequency of the rows.

9. The method of claim 1, wherein displaying further comprises displaying the frequency of the regions.

10. A machine-readable storage medium having stored thereon machine executable instructions, the execution of said instructions adapted to implement a method for displaying regions of a matrix, the matrix having at least one column and one or more rows having one or more fields related to individual data records, the method comprising:
displaying a starting region of the matrix, the starting region having one or more rows with each row having a field corresponding a data record;
determining a field corresponding to the matrix position which the computer user indicates via a first user interface;
obtaining a data record to which the determined field is related;
identifying the rows of the matrix relating to the obtained data record;
displaying, on detection of a user request via a second user interface to continue to display, a second region of the matrix which contains at least one identified row.

11. The machine-readable storage medium of claim 10, where identifying further comprises visual highlighting of content of the rows which are identified.

12. The machine-readable storage medium of claim 10, wherein displaying further comprises detecting a request for displaying a third region of the matrix which contains at least one identified row.

13. The machine-readable storage medium of claim 10, wherein determining a field and displaying a second region further comprises using a first user interface and a second user interface with identical hardware configuration.

14. The machine-readable storage medium of claim 10, wherein displaying further comprises fading out rows that are not identified.

15. The machine-readable storage medium of claim 10, wherein data records are organized in at least one first hierarchical level and one second hierarchical level, and wherein the instructions further comprise:
receiving an indication of the hierarchical level queried; and
identifying further comprises identifying the rows based on the hierarchical level queried.

16. The machine-readable storage medium of claim 15, wherein the indication takes place by way of a pointer position within the identified field.

17. The machine-readable storage medium of claim 10, wherein identifying further comprises displaying the frequency of the rows.

18. The machine-readable storage medium of claim 10, wherein displaying further comprises displaying the frequency of the regions.

19. A system comprising:
memory for storing instructions;
a processor, in communication with the memory, for executing the instructions, wherein the instructions are for:
displaying a starting region of the matrix, the starting region having one or more rows with each row having a field corresponding a data record;
determining a field corresponding to the matrix position which the computer user indicates via a first user interface;
obtaining a data record to which the determined field is related;
identifying the rows of the matrix relating to the obtained data record;
displaying, on detection of a user request via a second user interface to continue to display, a second region of the matrix which contains at least one identified row.

* * * * *